United States Patent
Hoffjann et al.

(10) Patent No.: US 8,034,495 B2
(45) Date of Patent: Oct. 11, 2011

(54) SEMI-AUTONOMOUS CENTRAL SUPPLY SYSTEM FOR PASSENGER SEATS

(75) Inventors: Claus Hoffjann, Hamburg (DE); Hansgeorg Schuldzig, Jork (DE)

(73) Assignee: Airbus Deutschland GmbH, Hamburg (DE)

( * ) Notice: Subject to any disclaimer, the term of this patent is extended or adjusted under 35 U.S.C. 154(b) by 1087 days.

(21) Appl. No.: 11/835,506

(22) Filed: Aug. 8, 2007

(65) Prior Publication Data

US 2008/0038597 A1    Feb. 14, 2008

Related U.S. Application Data

(60) Provisional application No. 60/821,735, filed on Aug. 8, 2006.

(51) Int. Cl.
*H01M 8/00* (2006.01)
*H01M 8/02* (2006.01)
*H01M 8/06* (2006.01)
*B64D 11/00* (2006.01)
*B64D 27/00* (2006.01)
*B64D 37/00* (2006.01)

(52) U.S. Cl. ........ 429/414; 429/421; 429/440; 429/444; 429/454

(58) Field of Classification Search .................. 429/428, 429/434, 436, 440, 444, 515; 244/53 R, 244/54, 55, 118.6, 122 R
See application file for complete search history.

(56) References Cited

U.S. PATENT DOCUMENTS

| | | | | |
|---|---|---|---|---|
| 4,211,537 A | * | 7/1980 | Teitel | 48/191 |
| 6,860,923 B2 | * | 3/2005 | Myasnikov et al. | 96/146 |
| 7,163,263 B1 | * | 1/2007 | Kurrasch et al. | 297/217.3 |
| 2002/0150803 A1 | * | 10/2002 | Yang | 429/26 |
| 2005/0069486 A1 | * | 3/2005 | Shaw | 423/658.2 |
| 2005/0158041 A1 | * | 7/2005 | Hoehne et al. | 392/339 |

FOREIGN PATENT DOCUMENTS

| | | |
|---|---|---|
| DE | 10317123 A1 | 11/2004 |
| DE | 112005002944 T5 | 11/2007 |

* cited by examiner

*Primary Examiner* — Gregg Cantelmo
(74) *Attorney, Agent, or Firm* — Christopher Paradies; Fowler White Boggs P.A.

(57) ABSTRACT

A system for generating energy for a consumer element in an aircraft includes the consumer element with a fuel cell element and a rechargeable metal hydride storage cell. The rechargeable metal hydride storage cell is designed for supplying the fuel cell element with hydrogen such that energy can be generated for the consumer element. The rechargeable metal hydride storage cell is furthermore designed in such a way that it can be charged with hydrogen.

12 Claims, 4 Drawing Sheets

100
SEMI-AUTONOMOUS CENTRAL SUPPLY SYSTEM FOR PASSENGER SEATS

REFERENCE TO RELATED APPLICATIONS

This application claims the benefit of the filing date of U.S. Provisional Patent Application No. 60/821,735 filed Aug. 8, 2006 and of German Patent Application No. 10 2006 037 054.6 filed Aug. 8, 2006, the disclosures of which are hereby incorporated herein by reference.

FIELD OF THE INVENTION

The field pertains to a device and a method for charging a rechargeable metal hydride storage cell, as well as to a system for supplying a consumer element with energy in an aircraft.

BACKGROUND OF THE INVENTION

In commercial aircraft, many modules perform more and more secondary tasks in addition to their original function. For example, passenger seats not only provide a high seating comfort and safety standard, but also fulfill secondary functions such as communication and entertainment functions, in certain instances, even enhanced comfort functions such as electric seat adjustments or massage functions.

In order to meet the energy demand of such modules, for example, modern passenger seats, each module may contain a device that is based on a fuel cell and generates electric energy for this multitude of auxiliary functions. An energy supply realized with the aid of a fuel cell also makes it possible to humidify the breathing air for the passenger occupying this seat element close to the respiratory tract.

In order to supply such a module or passenger seat with electric energy by means of a fuel cell, this fuel cell needs to be continuously supplied with its products, i.e., hydrogen and atmospheric oxygen. In this case, it would possible to arrange a central hydrogen tank in the aircraft and to deliver the hydrogen to the fuel cells on the modules or seats via distribution lines. The hydrogen distribution lines between the central hydrogen tank and the individual fuel cell elements are under constant pressure. Consequently, leaks and cracks could develop at their interfaces such that hydrogen would be able to escape into the cabin and lead to an oxyhydrogen reaction. This is the reason why the hydrogen lines are designed, for example, in a double-walled fashion and provided with a ventilation system between an inner and an outer pipe in order to blow off the escaping hydrogen in case the inner pipe develops a leak.

In order to autonomously realize a highly flexible module or aircraft seat, respectively, the metal hydride storage can be realized in the form of an exchangeable cartridge and arranged near the fuel cell to be supplied. This cartridge needs to be exchanged after the hydrogen contained therein is consumed. However, the need for exchange makes the process less efficient.

SUMMARY OF THE INVENTION

There may be a need for developing an autonomous energy generation system for a consumer element in an aircraft, as well as a supply of the energy generation system.

This need may be attained with a system for generating energy for a consumer element in an aircraft, as well as a device and a method for charging the system in an aircraft.

According to one embodiment of the invention, a system for generating energy for a consumer element in an aircraft includes a consumer element with a fuel cell element and a rechargeable hydride cell. The rechargeable metal hydride storage cell is designed for supplying the fuel cell element with hydrogen such that energy can be generated for the consumer element. The rechargeable metal hydride storage cell is furthermore designed in such a way that it can be charged with hydrogen.

According to another embodiment, a device for charging a system for generating energy for a consumer element in an aircraft according to the above-described characteristics includes a hydrogen line and a panel device with a filling valve element. The hydrogen supply line is designed for connecting a rechargeable metal hydride storage cell and the filling valve element of the panel device. The filling valve element is designed in such a way that a hydrogen source for charging the rechargeable metal hydride storage cell may be connected in a charging state. The hydrogen line is furthermore designed such that the hydrogen supply line is free of hydrogen in an operating state of the rechargeable metal hydride storage cell.

According to another embodiment, a method for charging a rechargeable metal hydride storage cell in an aircraft is created. The rechargeable metal hydride storage cell and a filling valve element of a panel device are connected by means of a hydrogen supply line. In a charging state of the rechargeable metal hydride storage cell, a hydrogen source for charging the rechargeable metal hydride storage cell is connected to the filling valve element, wherein the hydrogen supply line remains free of hydrogen in an operating state of the rechargeable metal hydride storage cell.

The term "operating state" of the rechargeable metal hydride storage cell refers to the state in which the rechargeable metal hydride storage cell delivers hydrogen to the fuel cell element or the state in which the aircraft is in operation, i.e., not situated on the ground for maintenance. The term "charging state" refers to the state in which the rechargeable metal hydride storage cell does not deliver hydrogen to the fuel cell element or the state in which the aircraft is not in operation.

In a rechargeable metal hydride storage, the hydrogen to be stored is stored in a metal or a metal alloy in dissolved form. Charging and discharging processes in metal hydride storages are always pressure-controlled and temperature-controlled (p, T) sorption processes. A physical compound, namely the metal hydride, is formed from the metal and the hydrogen. During the discharge of the metal hydride storage, the hydrogen is once again expelled and may be made available to a consumer element by means of desorption and a pressure reduction or decompression, as well as the addition of heat. During the charging of the metal hydride storage with hydrogen, the hydrogen is stored by means of adsorption and a pressure increase or compression, as well as the removal or release of heat.

The system allows for creation of an autonomous consumer element that can be supplied with energy in an autarkic fashion by means of a fuel cell element and a rechargeable metal hydride storage cell. In contrast to an hydrogen supply from a central hydrogen tank, in which a complex pipeline system transports the hydrogen to the fuel cells, the fuel cell system with a decentralized, rechargeable metal hydride storage cell need not utilize such a pipeline system. The position of the consumer elements can be flexibly changed without interrupting the hydrogen supply. In a central hydrogen supply, the hydrogen lines from the central hydrogen tank with the consumer element also need to be routed through the cabin and are constantly filled with hydrogen and therefore under pressure such that leaks could develop at the interfaces and hydrogen could escape into the aircraft and form oxyhydrogen gas in case of a crack or fracture. Consequently, the hydrogen supply lines need to feature dependable safety devices such as, for example, a double-walled pipe construction with an inner pipe and an outer pipe. In one example of a rechargeable and decentralized metal hydride storage cell for fuel cells, the hydrogen supply lines are pressurized only during a charging process, i.e., for a defined period of time. In addition, the charging process may take place only under controlled conditions, i.e., when the passengers are not on board. Thus, the safety requirements may be much less costly, eliminating heavy double-walled construction of the piping, for example, while further lowering the risk for the passengers in an aircraft. Furthermore, the service intervals may be extended and inspection and replacement of equipment for the recharging device may be made much easier and less frequent.

A device for charging a system for generating energy allows charging of a rechargeable metal hydride storage cell coupled to a consumer element. Since hydrogen supply lines may remain free of hydrogen in an operating state, deliver to a distributed network of consumer elements is made practical. The hydrogen supply lines are purposefully filled with hydrogen in a charging state in order to charge one or more rechargeable metal hydride storage cells. The charging state may be configured such that no passengers or other risk factors are present on board the aircraft during the charging process. For example, the cabin may be adequately vented during the charging state. Consequently, the risk during the charging state is substantially lowered, and the storage of hydrogen on board of an aircraft may be simplified.

In another example, the rechargeable metal hydride storage cell of the system is designed in such a way that the rechargeable metal hydride storage cell emits thermal energy in a charging state. For example, the hydrogen is fed to the rechargeable metal hydride storage cell under pressure such that thermal energy is created due to the adsorption of the hydrogen. This thermal energy is used, for example, to heat the cabin interior or other devices such that an improved energy balance is achieved without wasting thermal energy in an energy efficient fashion.

For example, the system may include a collection container. The collection container may be designed for collecting a water condensate from the exhaust of a fuel cell element. The rechargeable metal hydride storage cell may be arranged such that thermal energy generated in the charging state is thermally coupled, such as by conductive contact, with the collection container. Therefore, the thermal energy generated in the charging state is delivered to the collection container such that the water condensate is evaporated and sterilized with the aid of this thermal energy (i.e., a distillation process).

A reaction between hydrogen and oxygen takes place in a fuel cell, wherein these two starting materials (i.e., reactants) react such that water is obtained as a product. Heat may be created due to an exothermal reaction in the fuel cell, such that the water created is emitted from the fuel cell in the form of a water vapor exhaust, particularly on the cathode side of the fuel cell. The water vapor is purposefully exhausted to prevent it from condensing and backfilling the fuel cell. Backfilling of the fuel cell with water would reduce efficiency or prevent the fuel cell from generating energy.

The water condensate may be collected with the aid of a collection container. Periodically, the water may be drained and eliminated from the system. However, this drainage and elimination may result in increased maintenance costs. In one example of a system, a thermal energy created when the system is in a charging state is coupled, thermally, to the collection container. The thermal energy (i.e., heat) heats the water condensate collected in the collection container evaporating and sterilizing the water condensate. The water vapor may be used to humidify aircraft cabin air or may be used in the aircraft water system, for example. Consequently, it becomes unnecessary to empty the collection container, periodically, such that the maintenance intervals are extended and costs reduced. The system may include a device for delivering evaporated water condensate to an air conditioning element, such that the air in the cabin of an aircraft may be humidified with water vapor from the collection container.

According to another embodiment of the system, the rechargeable metal hydride storage cell is designed such that it is in thermally conductive contact with the fuel cell element. The rechargeable metal hydride storage cell is designed for absorbing thermal energy of the fuel cell element in an operating state such that the fuel cell element can be cooled. In an operating state of the system, the rechargeable metal hydride storage cell releases hydrogen to the fuel cell element in order to operate this fuel cell element. This causes the stored hydrogen of the rechargeable hydride cell to desorb such that the rechargeable metal hydride storage cell is cooled. Due to this cooling, the rechargeable metal hydride storage cell is able to absorb thermal energy or heat of the fuel cell element such that this fuel cell element is simultaneously cooled. This results in an improved energy balance, wherein heavy and complex cooling systems for the fuel cell element can be simultaneously eliminated. Consequently, the weight can be lowered and an increased maintenance expenditure can be prevented.

According to another embodiment of the system, the rechargeable metal hydride storage cell is designed such that it can be exchangeably arranged on the consumer element. Consequently, the rechargeable metal hydride storage cell may be easily exchanged without requiring time-consuming maintenance on-site. The maintenance expenditure of the system can be reduced in this fashion.

In another example, a metal hydride storage cell is integrally combined with a consumer element in a self-contained module such that the combined module is exchanged as a single unit. This reduces the costs of maintenance and the length of repair times for replacing defective units or units being replaced as part of scheduled maintenance. Furthermore, an integrally coupled storage cell and consumer element may have substantially improved thermal coupling than a separate replaceable storage cell and a separate, replaceable consumer element.

In another example, consumer element is a seat element with a fuel cell and a rechargeable metal hydride storage cell combined with the consumer element such that electric power or energy may be supplied in an autonomous or autarkic fashion. The configuration or arrangement of seat elements may be quickly changed or shifting without requiring complicated retrofitting work, such as a change of the energy supply. Consequently, the time required for changing a seat configuration in an aircraft is reduced such that the aircraft may be retrofitted faster. Consumer elements may be selected from a group consisting of seat devices, kitchen devices and toilet devices, for example.

In another example, a filling valve features a rapid-action coupling device, wherein the rapid-action coupling device is designed in such a way that a hydrogen flow can be realized when the hydrogen source is connected and the hydrogen flow can be shut off when the hydrogen source is disconnected. Consequently, the hydrogen source may be quickly connected to the filling valve and to realize a hydrogen flow without additional adjustments. Complicated adjustments prior to the filling of the rechargeable metal hydride storage cell therefore are not required such that a hydrogen flow can be realized very quickly.

In another example, the device also features an interface that is arranged between an inner region of the aircraft and an outer region of the aircraft. This interface may be arranged, for example, in the aircraft skin of the aircraft such that the inner region represents the entire interior of the aircraft and the outer region represents the surroundings of the aircraft separated by the aircraft skin. In this case, a panel device may be realized at the interface, such that the hydrogen source can be connected to the filling valve from the outer region. This means that the hydrogen source can be connected to the panel from outside without having to bring the hydrogen source on board the aircraft. This allows for quickly filling the rechargeable metal hydride storage cell with hydrogen from outside, for example, during a turn-around phase of the aircraft, i.e., between the landing phase and the starting phase of the aircraft, which has not been possible before for autonomous consumer elements distributed throughout the aircraft inner region.

In another example, the hydrogen supply line features a ventilation valve element and the panel device features an aeration valve element with an air connection. The ventilation valve element is designed for introducing air into the hydrogen supply line by means of the air connection in an open state, and the aeration valve element is designed for discharging the air from the hydrogen supply line in an open state, allowing purging of the hydrogen supply line of hydrogen between the panel element and the rechargeable metal hydride storage cell after charging of metal hydride storage cells with hydrogen. In this case, air is introduced into the aeration valve element until hydrogen is purged from the hydrogen supply line. Any hydrogen left in the hydrogen supply line is blown through the open ventilation valve element. This ensures that the hydrogen supply line is free of hydrogen after a charging process preventing the risk of an oxyhydrogen gas reaction in a hydrogen supply line, for example, during an operating state of the aircraft. Consequently, safety on board the aircraft is increased.

In another example, the system includes a control unit. The control unit is designed for controlling the ventilation valve element, the aeration valve element and the filling valve element. The individual valve elements do not have to be opened and closed manually, but rather may be centrally opened and closed by the control unit. The control unit may control the entire filling process. The control unit may initially ventilate the hydrogen supply line by opening the filling valve element as well as the ventilation valve element after all filling hoses are connected, i.e., after connecting the hydrogen source to the filling valve element and after connecting an air source to the air connection of the aeration valve element. This causes hydrogen to flow into the hydrogen supply line and to displace the air situated therein. The control unit closes the ventilation valve element after a defined time interval or after the hydrogen concentration in the hydrogen supply line is measured with the aid of sensors such that the pressure of the hydrogen situated in the line increases. The rechargeable metal hydride storage begins to fill due to the pressure being built up until it is completely charged with hydrogen. After a defined time interval, it is ensured that all metal hydride storages are filled such that the hydrogen filling valve is closed. The hydrogen remaining in the hydrogen supply line can subsequently be blown out with air by opening the ventilation valve element and the aeration valve element. The control unit is able to automatically and independently control this charging process such that a quick and reliable charging process of the rechargeable metal hydride storage is realized.

In another example, the hydrogen supply line is designed in such a way that a plurality of rechargeable metal hydride storage cells are connected to the filling valve element of the panel device. It is therefore possible to charge a multitude of rechargeable metal hydride storage cells with one hydrogen connection on the panel device. Consequently, all hydride storage cells situated in the aircraft can be charged during one charging process such that this charging process can be quickly realized. The embodiments of the device and of the system also apply to the method and vice versa. A plurality of valves may be arranged in the supply line, such that the control system or a maintenance system may be used to leak test the supply line.

BRIEF DESCRIPTION OF THE FIGURES

In order to further elucidate and better comprehend the present invention, embodiments thereof are described in greater detail below with reference to the enclosed drawings. In these drawings.

DETAILED DESCRIPTION

The example described and drawings rendered are illustrative and are not to be read as limiting the scope of the invention as it is defined by the appended claims. Identical or similar components in different figures are identified by the same reference symbols. The figures show schematic representations that are not drawn true-to-scale.

Figure 1:
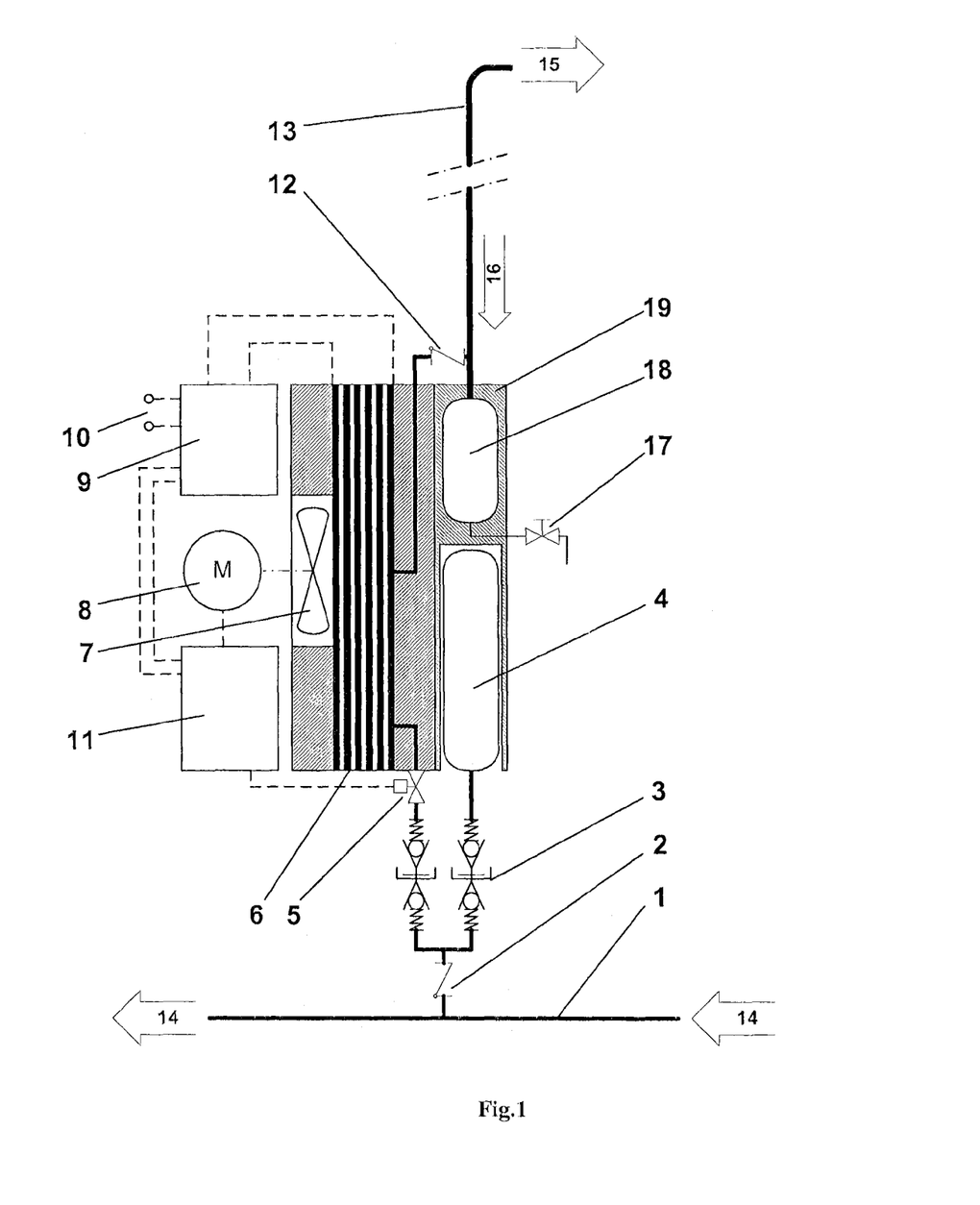
FIG. 1 shows a schematic representation of an embodiment of the system with an exchangeable metal hydride storage cell.

FIG. 1 shows an embodiment of the system for generating energy for a consumer element 20 in an aircraft. FIG. 1 shows a fuel cell element 6 and a rechargeable metal hydride storage cell 4. The rechargeable metal hydride storage cell 4 is designed for supplying the fuel cell element 6 with hydrogen. In this case, the rechargeable metal hydride storage cell 4 is designed in such a way that it can be charged with hydrogen.

FIG. 1 furthermore shows an embodiment of the system, in which the exchangeable metal hydride storage cell 4 and a collection container 18 are arranged in a separate component or carrier module 19. The carrier module 19 is respectively arranged or flanged on the fuel cell element 6 such that these components are in thermally conductive contact. The rechargeable metal hydride storage cell 4 is furthermore connected to a hydrogen supply line by means of a coupling and a check valve such that the rechargeable metal hydride storage cell 4 may be filled with hydrogen.

A control valve 5 with a coupling 3 can be controlled by a fuel cell control 11 arranged in the system such that hydrogen can either be conveyed from the hydrogen supply line 1 into the rechargeable metal hydride storage cell 4 or from the rechargeable metal hydride storage cell 4 to the fuel cell 6.

The electric energy generated by the fuel cell element 6 may be fed to a voltage converter 9 such that a controlled d.c.

voltage can be obtained at an output 10. The electric energy being generated may also supply a motor 8 that drives a fan 7. The fan 7 allows for control of supply cathode air in order to supply the fuel cell element with oxygen or ambient air, respectively.

The cathode exhaust air that has a high evaporated water content may furthermore be conveyed into the collection container 18, in which the moist cathode exhaust air condenses, by means of a check valve 12. The thermal energy created during the charging of the metal hydride storage cell 4 can be used for evaporating and sterilizing the condensate in the collection container 18, wherein the condensate is either discharged through a condensate outlet or humidified air 15 is made available via a breathing air supply line 16. In this case, the rechargeable metal hydride storage cell 4 is in thermally conductive contact with the collection container 18 and the fuel cell element 6.

If an aircraft is situated on the ground in a maintenance phase, the rechargeable metal hydride storage cell 4 may be supplied with hydrogen via the hydrogen supply line 1. This causes the rechargeable metal hydride storage cell 4 to fill and to heat up. The thermal range may be chosen such that the rechargeable metal hydride storage cell 4 is sufficiently heated up in order to evaporate the water situated in the collection container 18, but not to such a degree that it leads to the charging of the fuel cell element 6. In the embodiment according to FIG. 1, the rechargeable metal hydride storage cell 4 is configured in an exchangeable fashion such that the hydrogen demand of the fuel cell 6 can also be met by exchanging the empty rechargeable metal hydride storage cell 4.

Figure 2:
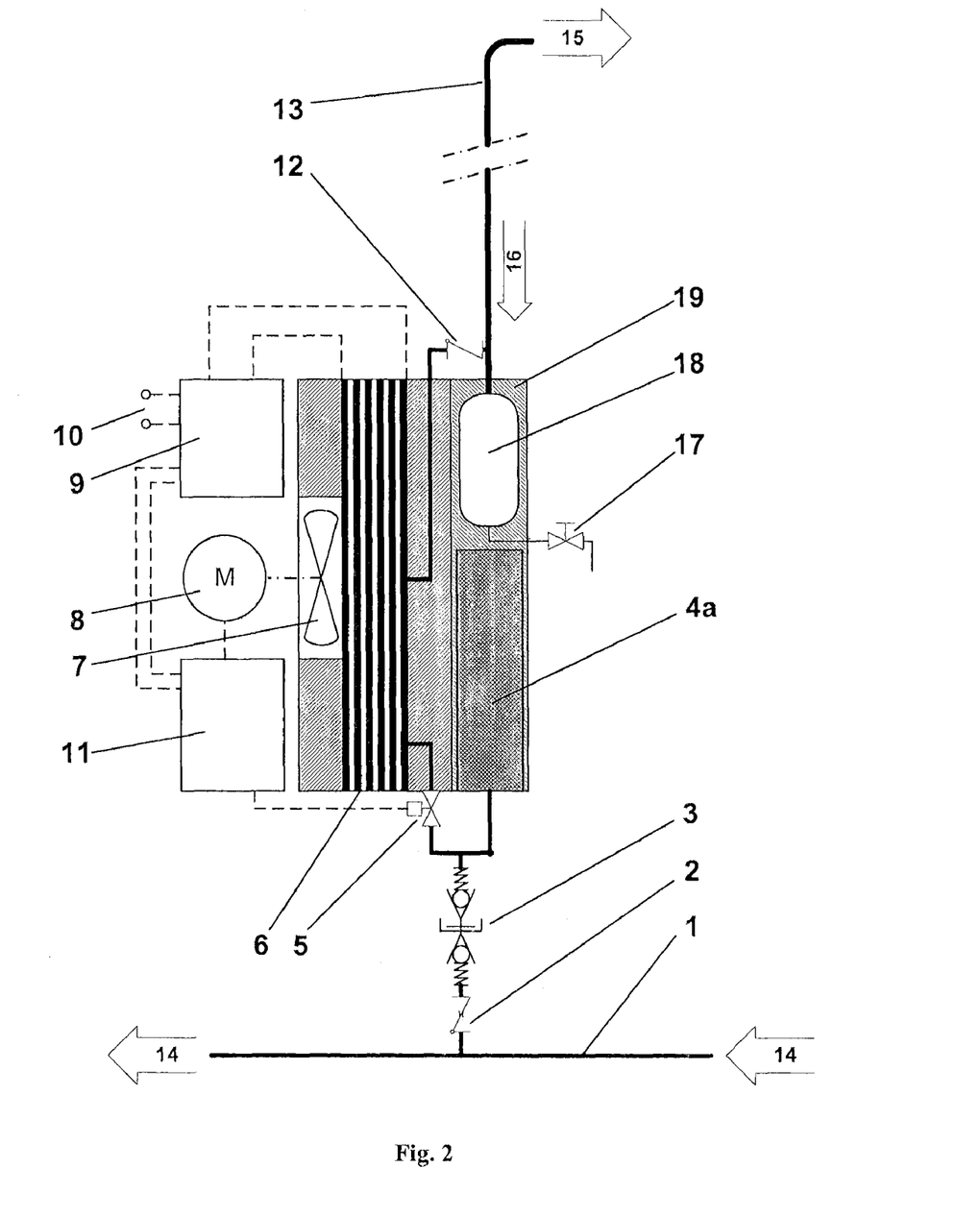
FIG. 2 shows a schematic representation of another embodiment, in which the metal hydride storage cell is shown as being integrated into the system.

FIG. 2 shows another embodiment of the system, in which the rechargeable metal hydride storage cell 4a is integrated into or realized in one piece with the separate component 19. This allows for a design that is more compact and saves more space, wherein this particular design is characterized by simplified connections and superior thermal junctions. For example, the coupling 3 and the check valve 2 can be realized in a simpler and more space-saving fashion. The rechargeable metal hydride storage cell 4 is filled via the hydrogen supply line 1. In this case, the rechargeable metal hydride storage cell 4 is in thermally conductive contact with the collection container 18 and the fuel cell element 6.

Figure 3:
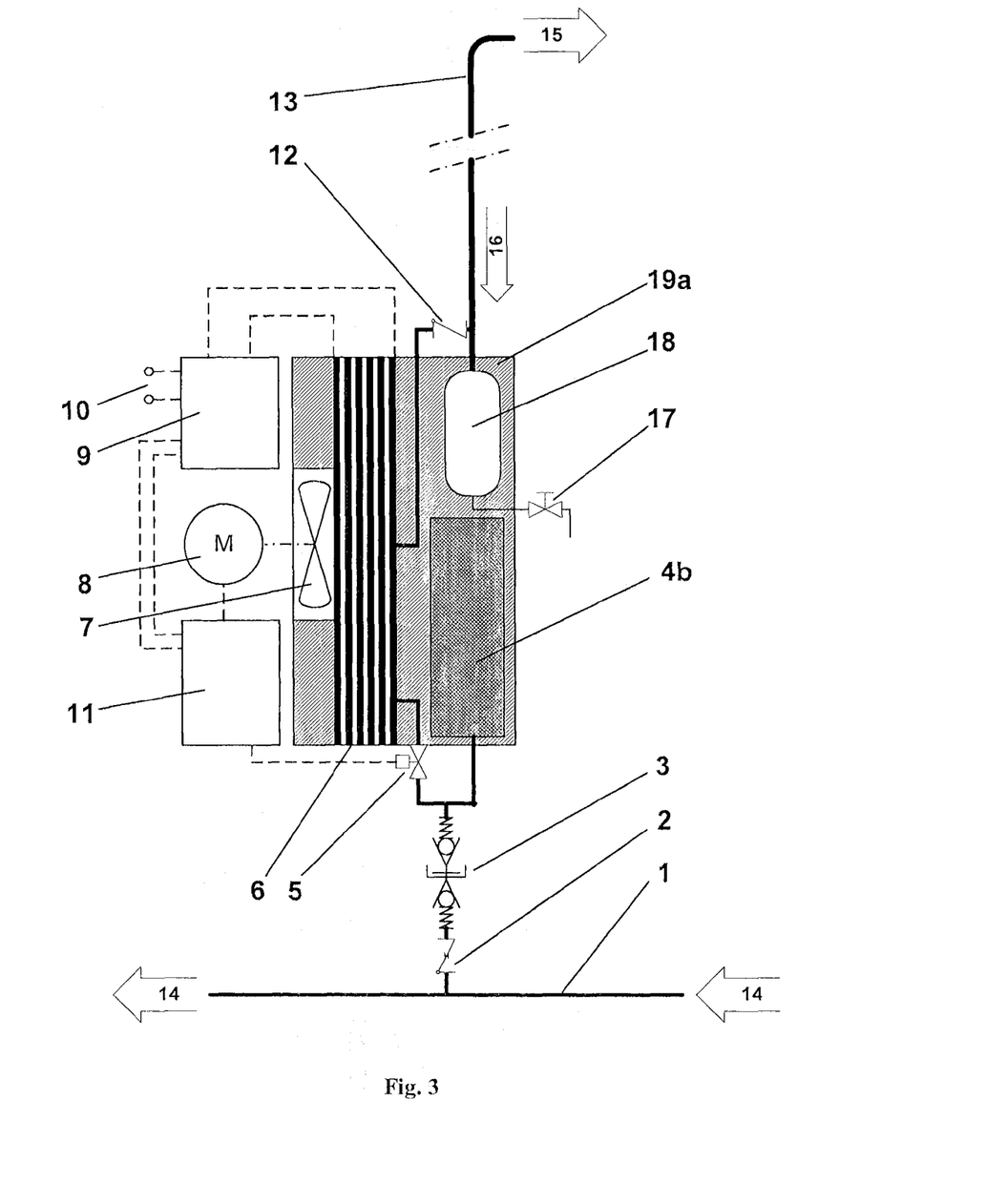
FIG. 3 shows a schematic representation of an embodiment of the system, in which the metal hydride storage cell and the collection container are directly integrated into a fuel cell.

FIG. 3 shows an embodiment, in which the rechargeable metal hydride storage cell 4 and the collection container 18 are integrally arranged in or realized in one piece with an end plate 19a of the fuel cell system 6. In this case, the end plate 19a forms part of the fuel cell 6. This embodiment makes it possible to additionally simplify the charging process and to further improve the respective thermal junctions between the rechargeable metal hydride storage cell 4 and the collection container 18 and between the rechargeable metal hydride storage cell 4 and the fuel cell element 6. Consequently, further weight reductions can be realized. In addition, the rechargeable metal hydride storage cell 4b can be integrated in such a way that it protrudes from the end plate 19a into the fuel cell element 6 and therefore is able, for example, to cool from the inside out due to the improved thermal conduction of the fuel cell element 6. The charging of the rechargeable metal hydride storage cell 4 is also realized via the hydrogen supply line 1. In this case, the rechargeable metal hydride storage cell 4 is in thermally conductive contact with the collection container 18 and the fuel cell element 6.

Figure 4:
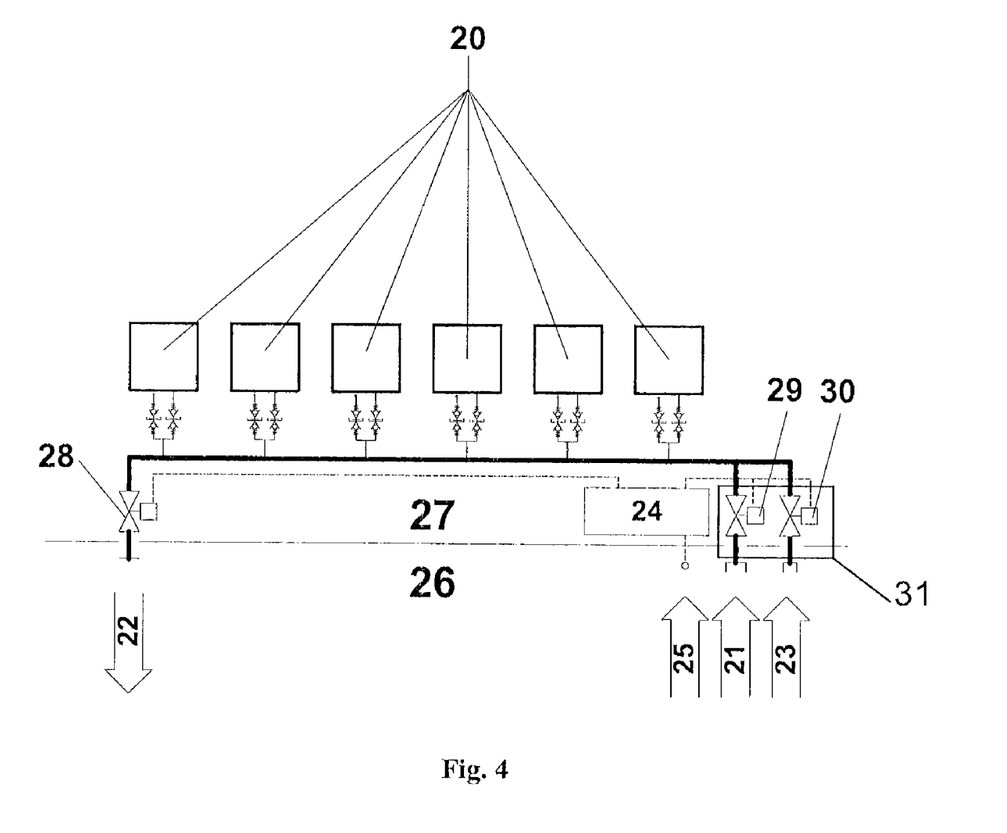
FIG. 4 shows a schematic representation of an embodiment of the device for charging the system with hydrogen.

FIG. 4 shows an embodiment of the device for charging a system for generating energy for a consumer element. In this case, the device features a hydrogen supply line 1 and a panel device 31 with a filling valve element 29. The hydrogen supply line 1 is designed in such a way that a rechargeable metal hydride storage cell of the consumer element 20 and the filling valve element 29 of the panel device 31 may be connected. In this case, the filling valve element 29 is designed in such a way that a hydrogen source can be connected in a charging state by means of a hydrogen connection 21 in order to charge the rechargeable metal hydride storage cell 4. In addition, the hydrogen supply line 1 is designed in such a way that the hydrogen supply line 1 is free of hydrogen in an operating state of the rechargeable metal hydride storage cell 4.

FIG. 4 furthermore shows that the panel 31 may feature an aeration valve 30 with an air connection 23 additional to the filling valve element 29, and that the hydrogen supply line 1 additionally features a ventilation valve element 28, for example, with a ventilating connection 22. The hydrogen supply line 1 also connects several consumer elements 20, wherein each of the consumer elements 20 features a rechargeable metal hydride storage 4.

In order to fill the rechargeable hydride storage cells 4 of the consumer elements 20, air may be initially vented from the hydrogen supply line 1. Consequently, a hydrogen source can initially be connected to a hydrogen connection 21 of the filling valve element 29. Compressed air can be connected by means of the aeration valve element 30. The hydrogen supply line 1 can initially be vented before the charging of the rechargeable hydride storage cells 4 with hydrogen begins. In this case, the ventilation valve element 28 and the aeration valve element 29 are opened after the air source and the hydrogen source are connected. This means that hydrogen flows into the hydrogen supply line 1 and displaces the air situated therein. After a defined time interval for achieving displacement of air by hydrogen, the aeration valve 30 may be closed such that hydrogen gas pressure increases. Due to the increase in pressure of the hydrogen situated in the hydrogen supply line 1, the rechargeable metal hydride storage 4 begins to fill and is simultaneously heated up. As described above, this heating may be used for heating the collection containers 18 such that water in the collection containers may be evaporated. After a defined time interval for charging the storage cells, it is ensured that all rechargeable hydride storage cells 4 are filled. The collection containers 18 may be emptied of water. The humid air produced by the evaporative process may be sterilized due to the process.

At the end of the charging process, the filling valve element 29 is closed. The hydrogen supply line 1 can now be vented such that it is free of hydrogen for safety reasons. In this case, the ventilation valve element 28 is opened and air is introduced through the aeration valve 30. All valves are closed and the supply hoses are disconnected once the system is free of a hydrogen after a certain time interval or after measuring the hydrogen concentration in the hydrogen supply lines 1.

The opening and closing of the aeration valve element 30, the ventilation valve element 28 and the filling valve element 29 can be controlled by means of a control unit 24. The manual control of the valves 28, 29, 30 therefore can be eliminated. The safety of the charging process can be additionally increased due to the automatic control.

FIG. 4 furthermore shows an outer region 26 and an inner region 27. The outer region 26 and the inner region 27 form an interface, on which the panel device 31 can be arranged. Consequently, the supply lines for air and hydrogen can be connected from the outer region 26. The control unit 24 arranged on the aircraft may furthermore feature a connection 25, to which an external control terminal can be connected. It is therefore possible, for example, for a hydrogen tanker to drive to the aircraft situated on the ground and to control the charging process from outside. For this purpose, the control unit 24 can be controlled by means of the external control connection 25 such that the valve elements 28, 29, 30 can be controlled from the outer region 26.

It should also be noted that "comprising" does not rule out any other elements or steps, and that "a" or "an" does not rule a multitude. It should furthermore be noted that characteristics or steps that were described with reference to one of the above embodiments can also be used in combination with other characteristics or steps of other above-described embodiments. The reference symbols in the claims should not be interpreted in a restrictive sense.

Alternative combination and variations of the examples provided will become apparent based on this disclosure. It is not possible to provide specific examples for all of the many possible combinations and variations of the embodiments described, but such combinations and variations may be claims that eventually issue.

LIST OF REFERENCE SYMBOLS

1 Hydrogen supply line
2 Check valve
3 Coupling
4, 4a, 4b Rechargeable metal hydride storage cell
5 Control valve
6 Fuel cell element
7 Fan
8 Motor
9 Voltage converter
10 Output for controlled d.c. voltage
11 Fuel cell control
12 Check valve
13 Air humidifying line
14 Temporary hydrogen supply
15 Humidified breathing air
16 Air line
17 Condensate outlet
18 Collection container
19 Carrier module
19a End plate
20 Consumer element
21 Hydrogen connection
22 Ventilation connection
23 Air connection
24 Control unit
25 External control connection
26 Outer region
27 Inner region
28 Ventilation valve element
29 Filling valve element
30 Aeration valve element
31 Panel device

The invention claimed is:

1. A system for generating energy in an aircraft, comprising:
a consumer element including a fuel cell element and a rechargeable metal hydride storage cell;
wherein the rechargeable metal hydride storage cell is coupled to the fuel cell element, such that the fuel cell element is supplied with hydrogen from the metal hydride storage cell and energy is generated for the consumer element;
the rechargeable metal hydride storage cell being rechargeable with hydrogen using a recharging device; and
a collection container, wherein the collection container is coupled to the fuel cell such that the collection container collects a water condensate from an exhaust of the fuel cell element
the rechargeable metal hydride storage cell is arranged such that a thermal energy emitted by the rechargeable hydride storage cell is thermally coupled with the collection container, and
the thermal energy evaporates the water condensate such that the water condensate is evaporated and sterilized using the thermal energy of the rechargeable metal hydride storage cell.

2. The system of claim 1,
wherein the rechargeable metal hydride storage cell emits thermal energy when the rechargeable metal hydride storage cell is recharged in a charging state.

3. The system of claim 1, wherein the rechargeable metal hydride storage cell is thermally coupled with the fuel cell element such that thermal energy of the fuel cell element, when in an operating state, is transferred from the fuel cell element to the rechargeable metal hydride storage cell.

4. The system of claim 1, wherein the rechargeable metal hydride storage cell is exchangeably coupled on the consumer element.

5. The system of claim 1, wherein the rechargeable metal hydride storage cell is integrally combined with the consumer element.

6. The system of one claim 1, wherein the consumer element is a passenger seat element.

7. A device including a system according to claim 1 comprising:
a hydrogen supply line; and
a panel device with a filling valve element;
wherein the hydrogen supply line couples a plurality of the systems according to claim 1, including each of the rechargeable metal hydride storage cells of the systems, with the filling valve element of the panel device; and
the filling valve element couples a hydrogen source to the rechargeable metal hydride storage cell such that each of the rechargeable metal hydride storage cells are recharged when charging with hydrogen, and in an operating state, the hydrogen supply line is purged of hydrogen, and the water condensate in the collection container is evaporated and sterilized using the thermal energy of the rechargeable metal hydride storage cell.

8. The device of claim 7 wherein the filling valve element features a rapid-action coupling device;
wherein the rapid-action coupling device is designed such that hydrogen is capable of flowing into the hydrogen supply line when the hydrogen source is coupled to the rapid-action coupling device and the hydrogen flow is shut off when the hydrogen source is uncoupled from the rapid-action coupling device.

9. The device of claim 7, further comprising:
an interface that is arranged between an inner region of the aircraft and an outer region of the aircraft;
wherein the panel device is arranged at the interface such that the hydrogen source is coupled to the filling valve element from the outer region, when in a charging state.

10. The device of claim 7, further comprising a ventilation valve element coupled to the hydrogen supply line, and;
the panel device comprising an aeration valve element coupled with an air connection to an external source of air, such that when the ventilation valve element is opened air is introduced into the hydrogen supply line through the air connection of the aeration valve element.

11. The device of claim 10, further comprising:
a control unit;
wherein the control unit is designed for controlling the ventilation valve element, the aeration valve element and the filling valve element, such that hydrogen is purged from the hydrogen supply line after charging and air is purged from the hydrogen supply line prior to charging.

12. The device of claim 7;
wherein the hydrogen supply line couples a plurality of rechargeable metal hydride storage cells with a single filling valve element.

* * * * *